(12) United States Patent
Crooijmans et al.

(10) Patent No.: US 8,068,336 B2
(45) Date of Patent: *Nov. 29, 2011

(54) DOCKING STATION FOR HAND HELD ELECTRONIC DEVICES

(75) Inventors: Wim Crooijmans, San Jose, CA (US); Richard P. Howarth, San Francisco, CA (US); Phillip M. Hobson, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/693,317

(22) Filed: Jan. 25, 2010

(65) Prior Publication Data

US 2010/0118485 A1 May 13, 2010

Related U.S. Application Data

(60) Continuation of application No. 12/202,290, filed on Aug. 31, 2008, now Pat. No. 7,675,746, which is a division of application No. 11/212,302, filed on Aug. 24, 2005, now Pat. No. 7,580,255.

(51) Int. Cl.
*G06F 1/16* (2006.01)

(52) U.S. Cl. ......... 361/679.41; 361/679.43; 361/679.55; 710/303; 710/304

(58) Field of Classification Search ............... 361/679.41
See application file for complete search history.

(56) References Cited

U.S. PATENT DOCUMENTS

| D328,277 S | 7/1992 | Leman et al. |
|---|---|---|
| D336,631 S | 6/1993 | Ivester |
| 5,233,281 A | 8/1993 | Chiang et al. |
| 5,280,229 A | 1/1994 | Faude et al. |
| 5,357,185 A | 10/1994 | Chen |
| D388,764 S | 1/1998 | Bartling et al. |
| 5,898,290 A | 4/1999 | Beard et al. |
| D409,987 S | 5/1999 | Okumura |
| D411,166 S | 6/1999 | Uemura et al. |
| 5,926,005 A | 7/1999 | Holcomb |
| D416,536 S | 11/1999 | Ross et al. |
| D419,160 S | 1/2000 | Davidson et al. |

(Continued)

FOREIGN PATENT DOCUMENTS

EP 1 104 150 5/2001

(Continued)

OTHER PUBLICATIONS

"Atech Flash Technology Iduo Ipod Dock and card Reader", downloaded Nov. 21, 2005; www.thegadgeteer.com.

(Continued)

*Primary Examiner* — Jayprakash N Gandhi
*Assistant Examiner* — Anthony Q Edwards
(74) *Attorney, Agent, or Firm* — Kilpatrick Townsend & Stockton LLP

(57) ABSTRACT

A docking system is disclosed. The docking system includes a single docking station and a plurality of inserts that are placed in the docking station so that the docking station can accommodate hand held devices with differing sizes and shapes. The docking system is configured with a docking station and insert that matingly engage with one another via a rotating action. The docking system is also configured with a latching retention mechanism that secures the insert to the docking station when the insert is rotated into engagement with the docking station.

13 Claims, 8 Drawing Sheets

U.S. PATENT DOCUMENTS

| | | | |
|---|---|---|---|
| 6,042,414 | A | 3/2000 | Kunert |
| D422,556 | S | 4/2000 | Okura et al. |
| D427,970 | S | 7/2000 | Sage |
| 6,115,247 | A | 9/2000 | Helot |
| 6,193,546 | B1 | 2/2001 | Sadler |
| D439,908 | S | 4/2001 | Gozani |
| D440,542 | S | 4/2001 | Hawkins et al. |
| D444,121 | S | 6/2001 | Chun et al. |
| D444,124 | S | 6/2001 | Casey et al. |
| 6,301,106 | B1 | 10/2001 | Helot et al. |
| D450,707 | S | 11/2001 | Francavilla et al. |
| 6,341,218 | B1 | 1/2002 | Poplawsky et al. |
| 6,344,727 | B1 | 2/2002 | Desai et al. |
| D454,332 | S | 3/2002 | Yokoyama |
| 6,394,300 | B1 | 5/2002 | Bosy |
| D459,299 | S | 6/2002 | Hughes et al. |
| D461,476 | S | 8/2002 | Evers et al. |
| D463,361 | S | 9/2002 | Ruohonen |
| D466,122 | S | 11/2002 | Moody |
| 6,483,698 | B1 | 11/2002 | Loh |
| D468,305 | S | 1/2003 | Ma et al. |
| 6,524,240 | B1 | 2/2003 | Thede |
| D472,900 | S | 4/2003 | Matsumoto |
| 6,716,058 | B2 | 4/2004 | Youn |
| D495,336 | S | 8/2004 | Andre et al. |
| 6,798,647 | B2 | 9/2004 | Dickie |
| 6,813,528 | B1 | 11/2004 | Yang |
| 6,994,575 | B1 | 2/2006 | Clark et al. |
| 7,014,486 | B1 | 3/2006 | Wu et al. |
| D525,616 | S | 7/2006 | Andre et al. |
| 7,075,579 | B2 * | 7/2006 | Whitby et al. ............... 348/375 |
| 7,238,042 | B2 | 7/2007 | Chen et al. |
| D551,212 | S | 9/2007 | Andre et al. |
| D551,213 | S | 9/2007 | Andre et al. |
| D552,085 | S | 10/2007 | Andre et al. |
| D558,738 | S | 1/2008 | Andre et al. |
| D558,739 | S | 1/2008 | Andre et al. |
| 7,381,095 | B2 | 6/2008 | Freeman et al. |
| 7,480,138 | B2 * | 1/2009 | Kogan et al. ............ 361/679.02 |
| 7,675,746 | B2 | 3/2010 | Crooijmans et al. |
| 2002/0024794 | A1 | 2/2002 | Lin et al. |
| 2002/0032042 | A1 | 3/2002 | Poplawsky et al. |
| 2002/0103008 | A1 | 8/2002 | Rahn et al. |
| 2002/0115480 | A1 | 8/2002 | Huang |
| 2002/0163780 | A1 | 11/2002 | Christopher |
| 2002/0173273 | A1 | 11/2002 | Spurgat et al. |
| 2002/0186319 | A1 | 12/2002 | Whitby et al. |
| 2003/0097379 | A1 | 5/2003 | Ireton |
| 2003/0148740 | A1 * | 8/2003 | Yau et al. ....................... 455/90 |
| 2003/0198015 | A1 | 10/2003 | Vogt |
| 2004/0195305 | A1 | 10/2004 | Dotson |
| 2004/0224638 | A1 | 11/2004 | Fadell et al. |
| 2004/0267825 | A1 | 12/2004 | Novak et al. |
| 2005/0047099 | A1 | 3/2005 | Mori et al. |
| 2006/0181840 | A1 * | 8/2006 | Cvetko ........................ 361/679 |
| 2006/0250764 | A1 | 11/2006 | Howarth et al. |
| 2007/0002533 | A1 * | 1/2007 | Kogan et al. ................ 361/686 |
| 2007/0014080 | A1 * | 1/2007 | McCormack ................ 361/679 |
| 2007/0217145 | A1 * | 9/2007 | Sung ............................ 361/686 |
| 2008/0304688 | A1 | 12/2008 | Kumar |

FOREIGN PATENT DOCUMENTS

| | | |
|---|---|---|
| WO | WO 00/60450 | 10/2000 |
| WO | WO 2004/084413 | 9/2004 |
| WO | WO 2006/080659 | 8/2006 |

OTHER PUBLICATIONS

"BookEndz Home Page", downloaded Apr. 11, 2003. www.bookendzdocks.com/bookendz/index.htm.

"iPodDock/iPod Cradle", downloaded Apr. 11, 2003, www.bookendzdocks.com/bookendzldock cradel.htm.

European Search Report dated Aug. 17, 2007 from EP Application No. 04760202.

International Search Report dated May 21, 2007 from PCT Application No. PCT/US2006/048670.

Sinitsyn, Alexander, "A Synchronization Framework for Personal Mobile Servers," Pervasive Computing and Communications Workshops (PERCOMW'04). Proceedings of the Second IEEE Annual Conference, Piscataway, NJ, USA, IEEE,.

U.S. Appl. No. 10/423,490 entitled "Media Player System", filed Apr. 25, 2003.

U.S. Appl. No. 11/125,883 entitled "Universal Docking Station for Hand Held Electronic Devices", filed May 9, 2005.

U.S. Appl. No. 29/237,084 entitled "Docking Station", filed Aug. 24, 2005.

U.S. Appl. No. 29/237,097 entitled "Dock Insert" filed Aug. 24, 2005.

U.S. Appl. No. 29/237,111 entitled "Dock Insert" filed Aug. 24, 2005.

U.S. Appl. No. 29/237,112 entitled "Dock Insert", filed Aug. 24, 2005.

U.S. Appl. No. 29/237,233 entitled "Dock Station", filed Aug. 24, 2005.

Search/Examination Report from corresponding EP Application No. 06789375.0 dated Jan. 29, 2009, 6 pages.

Search/Examination Report from corresponding PCT Application No. PCT/US2006/030396 dated Mar. 6, 2007, 10 pages.

Search/Examination Report from corresponding EP Application No. 06789375.0 dated Nov. 26, 2009, 5 pages.

Search/Examination Report dated Oct. 10, 2010 from European Patent Application No. 1017398.1, 10 pages.

* cited by examiner

DOCKING STATION FOR HAND HELD ELECTRONIC DEVICES

CROSS-REFERENCES TO RELATED APPLICATIONS

This application is a continuation of U.S. patent application Ser. No. 12/202,290, titled "DOCKING STATION FOR HAND HELD ELECTRONIC DEVICES," filed Aug. 31, 2008, which is a divisional of U.S. patent application Ser. No. 11/212,302, titled "DOCKING STATION FOR HAND HELD ELECTRONIC DEVICES," filed Aug. 24, 2005, now U.S. Pat. No. 7,580,255, and is related to U.S. patent application Ser. No. 10/423,490, titled, "MEDIA PLAYER SYSTEM," filed on Apr. 25, 2003, which are both incorporated by reference.

BACKGROUND

1. Field of the Invention

The present invention relates generally to docking stations for hand held electronic devices. More particularly, the present invention relates to a docking station that accommodates hand held electronic devices with different sizes and shapes.

2. Description of the Related Art

There exist today many styles of handheld electronic devices as for example cellular phones, personal digital assistants (PDA), media players (e.g., music player or video player), cameras, game player and the like. As is generally well known, these devices come in various shapes and sizes (e.g., thickness, width and height). The size and shape is typically dependent on various form factors including but not limited to ease of use, ergonomics, aesthetics, and the size of the components inside or outside the device. While it is likely that different manufacturers may produce the same type of hand held electronic device with differing shapes and sizes, it is also likely that one particular manufacturer may produce different models of the same type of hand held electronic device with different shapes and sizes.

By way of example, the iPod product line, which is manufactured by Apple Computer of Cupertino, Calif. comes in various sizes and shapes. Particularly, the iPod Mini has a pill shaped cross section and dimensions of 2.0×3.6×0.5 inches for 4 GB versions, while the standard iPod has a substantially rectangular cross and dimensions of 2.4×4.1×0.57 inches for a 20 GB version and 2.4×4.1×0.69 inches for a 40 GB version. Furthermore, the iPhoto model of the iPod has a substantially rectangular cross section similar to the standard version, but with dimensions of 2.4×4.1×0.75 for both 40 GB and 60 GB versions.

Docking stations provide a convenient interface for transferring data between the device and computing devices such as a personal computers or peripheral devices such as speakers, monitors and printers without having to reconnect and disconnect cables. The docking station may also provide an interface for connecting to a power source so that the hand held electronic device can be powered or charged (e.g., battery). In most cases, the docking stations include a slot within which the hand electronic device is received. The slot is configured to have a size and shape that coincides with the size and shape of the hand held device so that the hand held device rests snuggly within the slot. Furthermore, the slot includes a connector therein for operatively engaging a port of the hand held electronic device when the hand held electronic device is positioned within the slot. The connector is coupled to the external systems through a cable so that communications between the hand held electronic device and the external systems can take place.

Because the slot has a size and shape that coincides with the size and shape of a particular hand held device, the docking station is typically dedicated to the particular handheld device. Other devices typically cannot be used with the docking station. The slots themselves are simply incapable of supporting more than one device. As a result, users with an arsenal of devices have to wield a variety of docking stations, one for each device in their arsenal. This produces clutter and can be confusing to the user. This also presents problems to the manufacturer of multiple devices in that they need to produce a variety of docking stations (one for each unique device), which adds costs and complexity in the design, manufacture, assembly, and packaging of the devices. This is especially true with devices in the same product line as for example the iPod described above.

Some docking stations come packaged with removable spacers that can change the size and shape of the slot thereby accommodating more than one device.

FIG. 1 is an exemplary side elevation view of a docking station 10 that utilizes a removal spacer 12. The removable spacer 12 is positioned in an opening 14 in the housing 16 of the docking station 10, and includes a lip 18 and a bumper 20 disposed below the lip 18. The lip 18 and bumper 20, which protrude outwardly, completely surround the periphery of the spacer 12. The bumper 20 is formed from a deformable material such as rubber that can deform inwardly during insertion and extraction thereby allowing the bumper 20 to be pressed over an edge 22 of the opening 14. The peripheral lip 18 and the bumper 20 cooperate to form a channel that captures the edge 22 in order to secure the spacer 12 to the housing 16 of the docking station 10. Furthermore, the spacer 12 includes an opening 26 for receiving a connector 28 positioned in the opening 14 of the docking station 10.

Although spacers such as these work for their intended purpose, they still suffer from several drawbacks. For one, the spacer is difficult to insert and remove and has a rough feel, which leaves a negative impression on the user. This is due in part to the vertical positioning of the spacer within the docking station and the large force that is required to overcome the rubber bumper since it is somewhat rigid and extends completely around the spacer. Furthermore, in cases where the insert includes an angled basin, the hole in the bottom of the basin must be made large to allow enough space for the connector (e.g., clearance). This however, leaves gaps, which are aesthetically unpleasing and which provide paths for dust and other foreign matter into the docking system.

An improved docking station that utilizes spacers is therefore desired.

SUMMARY

The invention relates, in one embodiment, to a docking station for handheld devices with varying shapes and sizes. The docking station includes a top member with a cavity formed therein. The cavity is configured to rotatably receive a removable insert that accommodates the bottom end of a hand held device with a particular size and shape.

The invention relates, in another embodiment, to a removable insert for hand held devices with varying shapes and sizes. The removable insert includes a basin having an opening and an enclosed region that receives the bottom end of a hand held device with a particular size and shape. The basin is configured for rotatable insertion and extraction to and from a docking station. The removable insert rotates between an initial position, where the removable insert is capable of being inserted or extracted, and a mounted position, where the removable insert is secured in the docking station.

The invention relates, in another embodiment, to a docking system for a handheld device. The docking system includes a docking station. The docking system also includes a removable insert. The removable insert is configured to rotate relative to the docking station during insertion and extraction from the docking station.

The invention relates, in another embodiment, to a docking station. The docking station includes a top member with a cavity formed therein. The cavity is configured to rotatably receive a removable insert that accommodates the bottom end of a hand held device with a particular size and shape. The docking station also includes a connector disposed in the cavity. The connector protrudes through a bottom wall of the cavity. The docking station further includes a collar surrounding and positioned at the base of the connector. The collar protrudes through the bottom wall of the cavity with the connector. The collar is configured to produce a snug fit with an opening in the removable insert when the removable insert is positioned within the cavity of the top member. The opening in the removable insert is configured to allow rotation of the removable insert into the cavity without hitting the connector.

The invention relates, in another embodiment, to a removable insert for hand held devices with varying shapes and sizes. The removable insert includes a basin having an opening and an enclosed region that receives the bottom end of a hand held device with a particular size and shape. The basin is configured for insertion and extraction within a cavity of a docking station. The removable insert also includes a lip that surrounds and extends away from the opening in the basin. The lip is configured for placement in a recess in the docking station. The recess catches the lip and provides a reference point for the insert during insertion and extraction from the cavity of the docking station. The removable insert further includes one or more tabs extending from the front wall of the basin, and configured to mate with corresponding slots located inside the cavity of the docking station. The removable insert additionally includes a catch formed on the back wall of the basin, and configured to mate with a latch located within the cavity of the docking station.

The invention relates, in another embodiment, to a docking system. The docking system includes a docking station. The docking station includes a top member. The docking station also includes a pocket formed in the top member and configured to receive a plurality of inserts therein. The cavity includes an opening and an enclosed region that are sized to accommodate the largest insert. The enclosed region has sidewalls and a bottom wall that surround the inserts when they are placed in the cavity. The docking station further includes a recess formed in the top member and surrounding the opening in the pocket. The docking station additionally includes a connector located within the pocket and protruding through the bottom wall of the pocket. The docking station also includes a collar surrounding and positioned at the base of the connector. The collar protrudes through the bottom wall of the pocket with the connector.

The docking system also includes a plurality of removable inserts. Each of the removable inserts includes a basin configured for rotatable insertion into the pocket of the docking station. The basin includes an opening and an enclosed region that are sized to accommodate a particular hand held device. The enclosed region has sidewalls and a bottom wall that surround the bottom end of the particular hand held device. The bottom wall includes a hole for receiving the connector and collar when the basin is rotated within the pocket of the docking station. The edge of the hole includes a chamfer so that the basin clears the connector when the basin is rotated within the pocket of the docking station. Each of the removable inserts also includes a lip that surrounds and extends away from the opening in the basin. The lip is configured for placement in the recess in the top member. The recess catches the lip and provides a reference point about which the insert is rotated when inserted and extracted from the pocket of the docking station.

The docking system further includes a retention mechanism configured to secure the inserts within the docking station. The retention mechanism includes one or more slots formed in a front wall of the pocket. The retention mechanism also includes one or more tabs extending from the front wall of the basin, and configured to mate with the slots. The retention mechanism further includes a catch formed on the back wall of the basin. The retention mechanism additionally includes a latch located on the back wall of the pocket and configured to move between a latched position, where the catch is captured by the latch, and an unlatched position, where the catch is released from the latch. The latch includes a detent that springs into engagement with the catch when the insert is rotated into its final position within the pocket of the docking station. The latch also includes a flexure that biases the detent towards the center of the pocket.

BRIEF DESCRIPTION OF THE DRAWINGS

The invention may best be understood by reference to the following description taken in conjunction with the accompanying drawings in which.

DESCRIPTION OF EXEMPLARY EMBODIMENTS

The present invention relates generally to a docking station for portable electronic devices. The docking station provides a platform for quickly and easily coupling a hand held electronic device to another system or device as for example a computer, a power source, or peripheral devices such as a monitor, a keyboard, speakers, etc. A primary advantage of using a docking station is that the user does not have to separately connect one device at a time.

The docking station may be a stand alone unit that communicates with other devices or systems through wired (e.g., cables) or wireless (e.g., Bluetooth) connections, or alternatively, the docking station may be integrated directly into the other devices or systems. In either case, the docking station includes an opening or slot that receives the portable electronic device. The opening is typically configured to support the portable electronic device in an upright (e.g., vertical) or laid down (e.g., horizontal) position while maintaining access to the U.I. portion of the portable electronic device.

The dock also includes a way of interfacing the portable electronic device with the other devices or systems. By way of example, the opening may include one or more connectors that engage one or more ports on the portable electronic device when the portable electronic device is placed in the opening. In the case of a stand alone unit, the connector may be coupled to other connectors, ports or transceivers that provide external connections to the other devices or systems. In the case of an integrated docking station, the connector may be wired directly to the components of the host device.

More particularly, the present invention relates to docking stations that utilize removable inserts that accommodate portable hand held devices with different sizes and shapes. The docking station includes an opening that receives all the various inserts, and each of the inserts has a slot or opening that accommodates a particular hand held device. The number of inserts generally depends on the number of devices that are served by the docking station. One aspect of the invention relates to inserts that are rotated in and out of the docking station. Another aspect of the invention relates to a quick release latching mechanism that allows the insert to be temporarily secured to the docking station. Both features allow the inserts to be inserted and extracted into the docking station with simplicity, ease and minimal effort (thereby leaving a positive impression on the user).

Embodiments of the invention are discussed below with reference to FIGS. 2-8. However, those skilled in the art will readily appreciate that the detailed description given herein with respect to these figures is for explanatory purposes as the invention extends beyond these limited embodiments.

Figure 1:
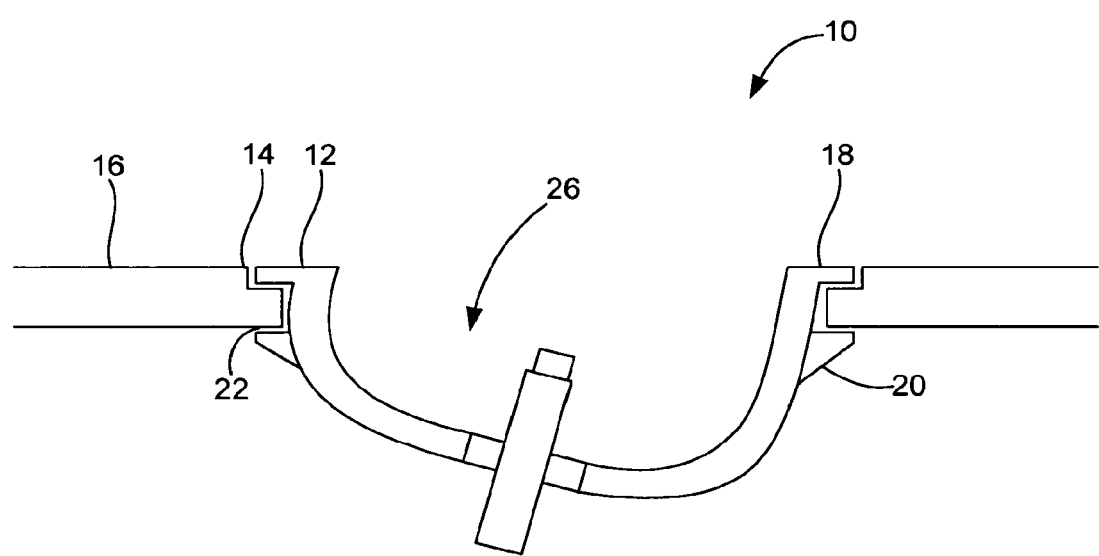
FIG. 1 is an exemplary side elevation view of a docking station that utilizes a removal spacer.
Figure 2:
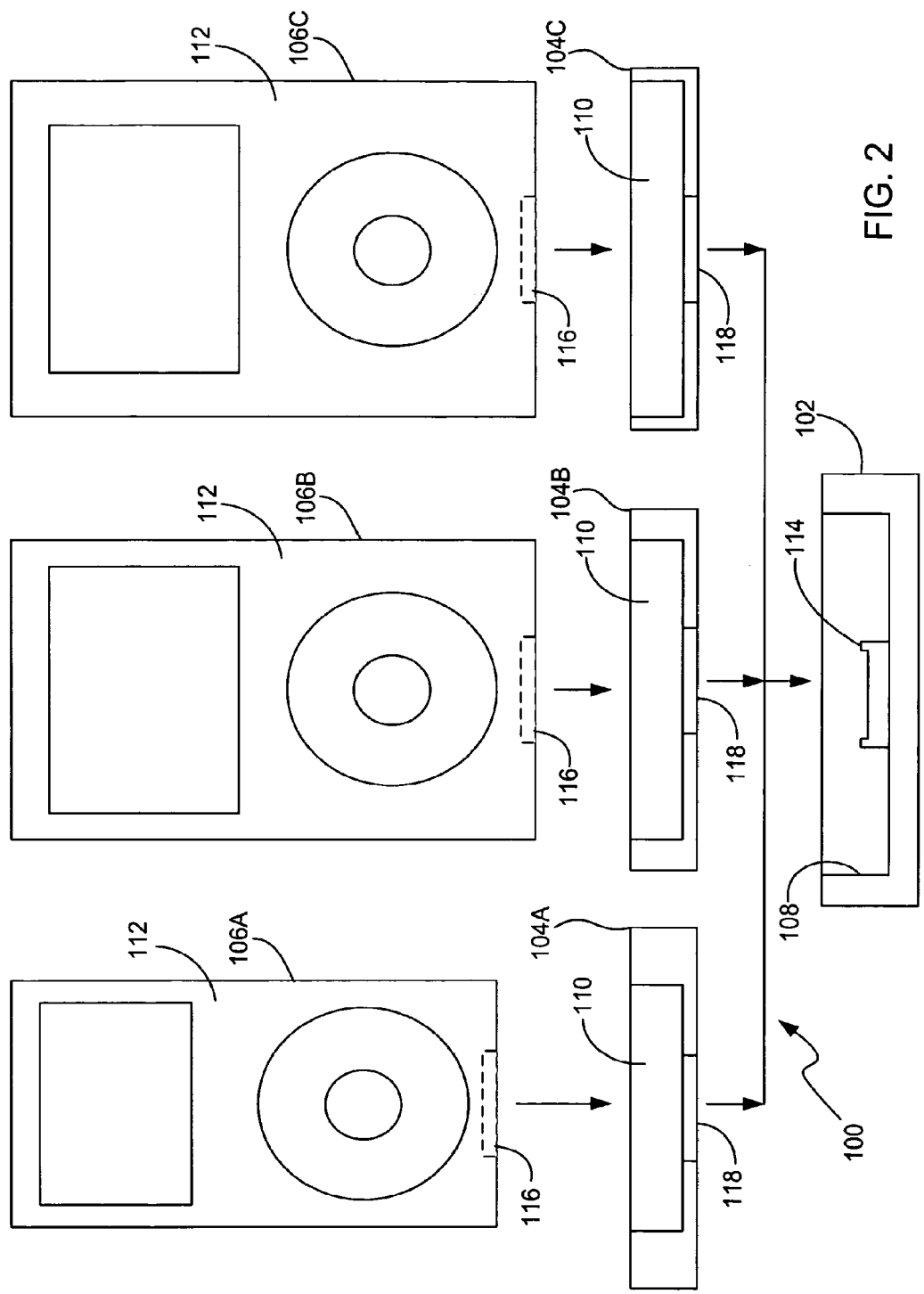
FIG. 2 is a simplified diagram of a docking system, in accordance with one embodiment of the present invention.

FIG. 2 is a simplified diagram of a docking system 100, in accordance with one embodiment of the present invention. The docking system 100 includes a single docking station 102 and a plurality of inserts 104. Each of the inserts 104 are received by the docking station 102 and are configured to accommodate hand held devices 106 with different sizes and shapes. In essence, the inserts allow different dimensioned devices to be placed in the same docking station. As shown, there is an insert 104A-C for each differently configured hand held device 106A-C. The hand held devices 106A-C may for example correspond to media players such as the iPod class of media players manufactured by Apple Computer, Inc. of Cupertino Calif.

In most cases, the docking station 102 includes an opening 108 for receiving each of the inserts 104 and the inserts 104 include an opening 110 for receiving a hand held device 106 with a particular size and shape. That is, the opening 108 in the docking station 102 is sized and dimensioned to allow each of the inserts 104 to be positioned therein, and the openings 110 in the inserts 104 are sized and dimensioned to allow a particular device to be positioned therein. Furthermore, the openings 108 and 110 may be configured to support the hand held device 106 in an upright (e.g., vertical or angled), or laid down (e.g., horizontal) position. When upright, the openings 108 and 110 are typically configured to surround the front, back and left and right sides of the hand held device 106 and when laid down, the openings 108 and 110 are typically configured to surround the top and bottom sides and the left and right sides of the hand held device 106. In either case, access to the U.I. portion 112 of the hand held device 106 is preferably maintained.

When coupled with an insert 104, the hand held device 106 is configured to correctly interface with the docking station 102 in order to allow communications between the hand held device 106 and other devices or systems connected to the docking station 102. The docking station 102 may for example include a connector 114 inside the opening 108 that couples to a port 116 on the hand held device 106 through a hole 118 in the insert 104. The opening 110 in the insert 104 is configured to guide the port 116 of handheld device 106 into alignment with the connector 114 that is disposed within the hole 118.

The docking station 102 may be a stand alone unit that communicates with other devices or systems through wired (e.g., cables) or wireless (e.g., Bluetooth) connections, or alternatively, the docking station 102 may be integrated directly into the other devices or systems. An example of a docking station that can be used may be found in U.S. patent application Ser. No. 10/423,490, which is herein incorporated by reference.

Figure 3A:
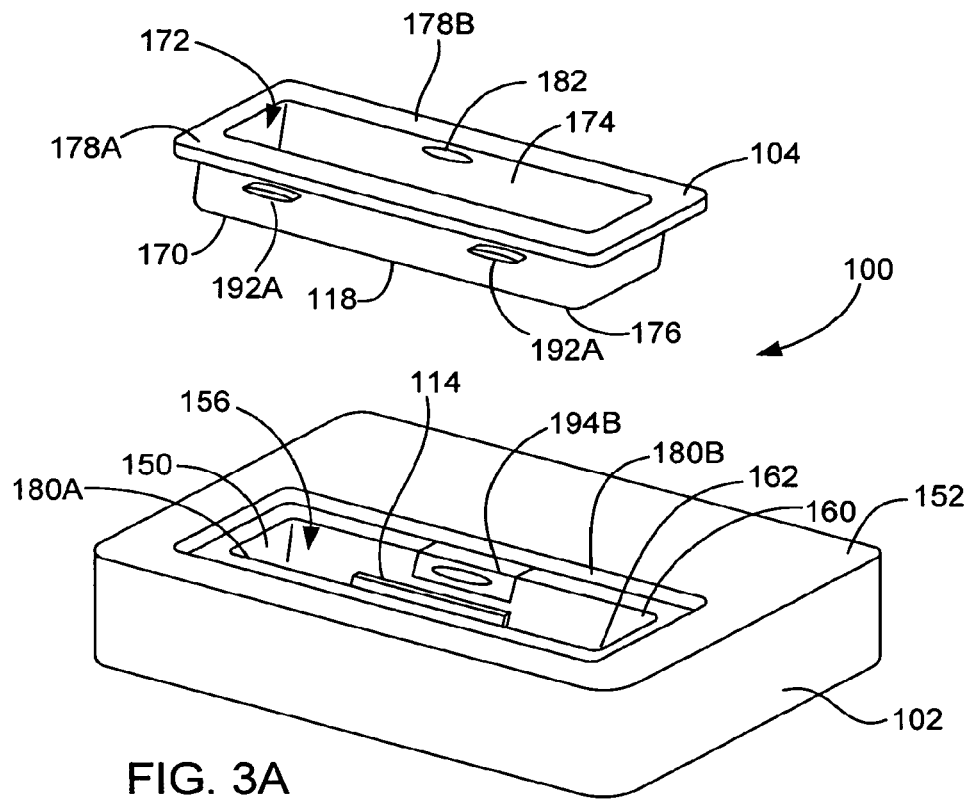
FIG. 3A is a front perspective view of a docking system, in accordance with one embodiment of the present invention.
Figure 3B:
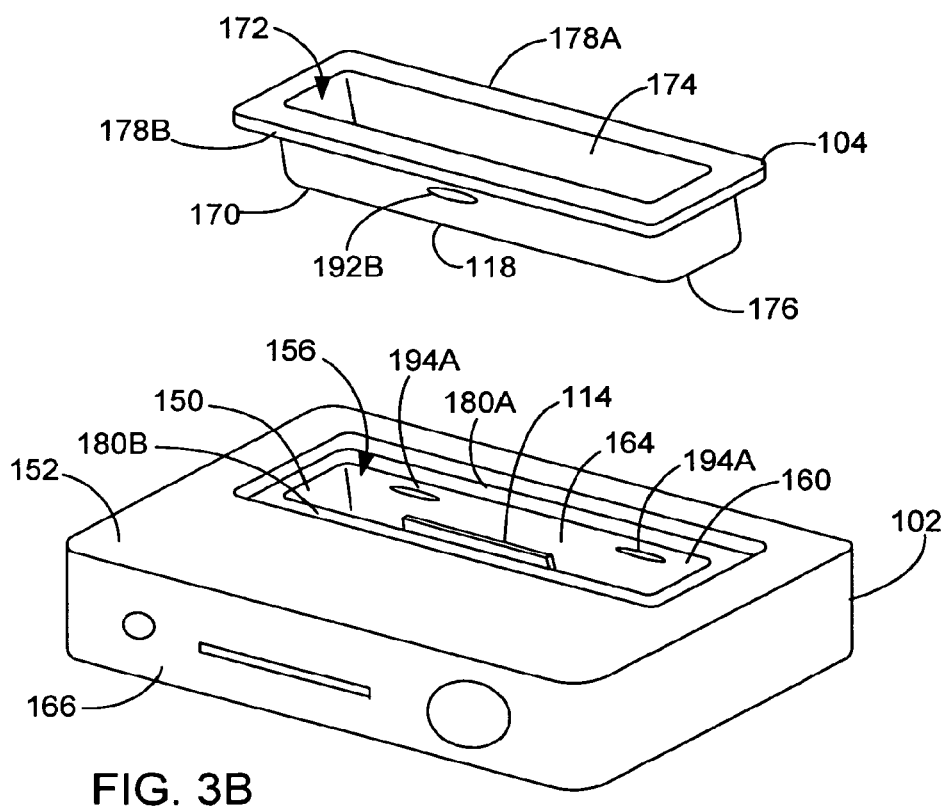
FIG. 3B is a rear perspective view of the docking system shown in FIG. 3A, in accordance with one embodiment of the present invention.

Referring to FIGS. 3A and 3B, one embodiment of the docking system 100 will be described in greater detail. In this embodiment, the docking station 102 is a stand alone unit. It should be appreciated, however, that the features of the stand alone docking station may be equally applied to integrated docking stations.

As shown, the docking station 102 includes a cavity 150 disposed in a top member 152. The cavity 150 is a depression or pocket capable of receiving each of the various inserts 104 therein (and possibly the largest hand held device). The cavity includes an opening 156 and an enclosed region having sidewalls 160 and a bottom wall 162. The insert 104 is placed within the opening 156 and rests inside the cavity 150 where it is surrounded by the various walls 160 and 162. The size and shape of the cavity 150 is generally configured to accommodate the largest insert 104. The top member 152, on the other hand, is a portion of a housing 154 of the docking station 102.

The connector 114 is located within the cavity 150, and typically protrudes from the bottom wall 162 of the cavity 150. The connector 114 may for example be attached to a PCB and extend through a hole 164 in the bottom wall 162. In integrated systems, the connector 114 is typically hard wired to the components of the host system (e.g., boom box). In stand alone systems, the connector 114 may electrically connect to various I/O interfaces 166 located on the side, and more particularly the backside of the docking station 102 so that the docking station 102 can communicate with other devices and systems. By way of example, the I/O interfaces may include audio and video jacks, data ports, electrical outlets, and/or the like.

Referring to the inserts 104, the inserts 104 include a basin 170 for receiving the bottom end of the hand held device. Similar to the cavity 150, the basin 170 includes an opening 172 and an enclosed region formed by side walls 174 and a bottom wall 176. However, unlike the cavity 150, the opening 172 and walls 174 and 176 are sized and dimensioned to correspond to a particular hand held device. That is, the inner periphery of the basin 170 coincides with the outer periphery of a particular hand held device. Furthermore, the basin 170 has a depth that supports the handheld device in an upright position while still providing access to the user interface of the hand held device when the hand held device is disposed within the insert 104 and docking station 102. Moreover, the depth and outer periphery of the basin 170 is smaller than the depth and inner periphery of the cavity 150 so that the basin 170 can be seated properly within the cavity 150.

The basin 170 may be vertical or angled. In the illustrated embodiment, the basin 170 is angled so that the hand held device is placed in a tilted orientation when situated in the docking station 102. By way of example, the angle may be about 15 degrees from vertical.

The hole 118 for receiving the connector 114 is disposed within the bottom wall 176 of the basin 170. The connector 114 extends through the hole 118 and into the basin 170 where it eventually plugs into a port on the bottom end of the hand held device. In most cases, the connector 114 is positioned parallel to the side walls 174. Thus, the connector 114 has the same angle as the basin 170. In fact, the side walls 174 of the basin 170 are used to guide the hand held device over and into engagement with the connector 114.

The insert 104 may be supported by the walls of the cavity 150 and/or the top member 152 of the docking station 102. In the illustrated embodiment, the insert 104 includes a lip 178 which surrounds the opening 172 in the basin 170 and which rests on the top member 152 of the docking station 102. More particularly, the top member 152 includes a recess portion 180 that surrounds the opening 156 of the cavity 150, and that receives the lip 178 therein. The lip 178 typically has an outer profile that coincides with the inner profile of the recess portion 180. This is done to reduce gaps between the insert 104 and the docking station 102 and provide mating surfaces for positioning and supporting the insert 104 relative to the docking station 102, i.e., helps align the hole 118 with the connector 114. Furthermore, the depth of the recess portion 180 typically coincides with the thickness of the lip 178 so that the top surface of the insert 104 lies flush with the top surface of the top member 152 when the insert 104 is seated within the docking station 102. This particular arrangement provides a clean and continuous appearance that is aesthetically pleasing to the user. This may also help hide the fact that an insert is being used.

In accordance with one embodiment of the present invention, the insert 104 is positioned within the docking station 102 via rotating action. That is, the insert 104 is configured to rotate relative the docking station 102 between a released position and a mounted position. The rotating action provides a more elegant solution for inserting and removing the insert 104 to and from the docking station 102.

During insertion, a user places the front lip 178A of the insert 104 within the front recess 180A of the docking station 102 and rotates the insert 104 about this interface. The recess 180A catches the front lip 178A and provides a reference surface about which the insert 104 can be rotated. At the end of the rotating action, the entire lip 178 is positioned within the recess 180 thereby placing the insert 104 in the desired relationship with the docking station 102. That is, the basin 170 is placed within the cavity 150, and the connector 114 extends through the hole 118 in the bottom of the basin 170.

During extraction or removal, a user lifts the back end of the insert 104 away from the docking station 102 and rotates the insert 104 about the lip/recess interface. As the insert 104 is rotated, the basin 170 is pulled out of the cavity 150 and the connector 114 is removed from the hole 118. At the end of rotation, the insert 104 is freed from the docking station 104 and thus it can be removed from the docking station 102. In some cases, the back end of the insert 104 may include a void 182 that forms a lip that can be used as a handle to lift the insert 104 away from the docking station 102.

In accordance with another embodiment, the docking system 100 includes a retention mechanism for securing the insert 104 to the docking station 102. The retention mechanism consists of at least two features, an insert feature 192 and a docking station feature 194. These features are cooperatively positioned so that when the insert 104 is inserted into the docking station 102 (e.g., via the rotating action), the features 192 and 194 engage with one another thus securing the insert 104 to the docking station 102. In most cases, the features 192 and 194 are strategically positioned about the periphery of the basin 170 and the cavity 150. For example, the features 192 and 194 may be located on the side walls including the front, back, right and left walls. Furthermore, the mating features 192 and 194 are typically positioned in an opposed relationship. For example, if there are mating features 192 and 194 on the front wall then there tend to be mating features 192 and 194 on the back wall. The features may be widely varied. By way of example, the features may include nubs, grooves, channels, catches, hooks, slots, guides, tabs and/or the like that mate with one another in order to hold the insert 104 in place. The features 192 and 194 may also include more complex mechanisms such as latches, locks, snaps and/or friction couplings.

In the illustrated embodiment, the front side of the insert 104 includes one or more tabs or hooks 192A that mate with one or more slots 194A located in the front side of the cavity 150 (or vice versa). Further, the backside of the insert 104 includes a catch 192B that mates with a latch 194B located in the backside of the cavity 150. The latch 194B is configured to move between a latched and unlatched position. In the latched position, the latch 194B captures the catch 192B thereby securing the insert 104 to the docking station 102. In the unlatched position, the catch 192B is released from the latch 194B thereby allowing the insert 104 to be removed from the docking station 102. The catch may be widely varied. For example, the catch may be selected from voids, ribs, pockets, openings, etc.

During insertion, as for example when the insert 104 is rotated inwards, the slots 194A are configured to capture the tabs 192A and the latch 194B is configured to capture the catch 192B thereby securing the insert 104 to the docking station 102. The catch 192B may for example be captured by the latch 194B by moving the latch 194B from the unlatched to the latched position during or after the rotating action.

During extraction, as for example when the insert 104 is rotated outwards, the catch 192B is configured to disengaged from the latch 194B, and the tabs 192A are configured to disengage from the slots 194A thereby releasing the insert 104 from the docking station 102. The catch 192B may for example be disengaged from the latch 194B by moving the latch 194B from the latched to the unlatched position before or during the rotating action.

In some cases, the insert 104 may additionally include a pull or handle 182 for helping disengage the catch from the latch and/or to help remove the insert from the cavity. The pull 182 provides a surface that a user can grab in order to lift the insert away from the cavity. By way of example, the pull 182 may be a recess or a ridge, both of which can be grasped by a finger of the user.

Figure 4A:
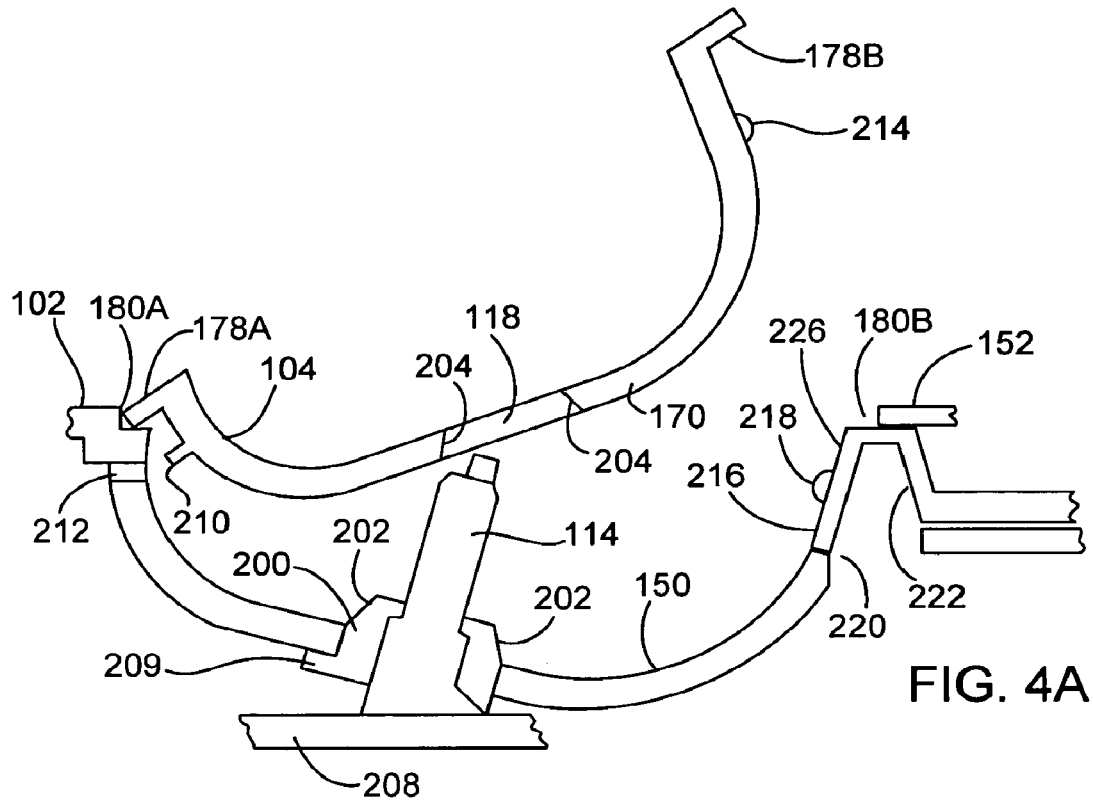
FIGS. 4A and 4B are side elevation views of a docking system, in accordance with one embodiment of the present invention.
Figure 4B:
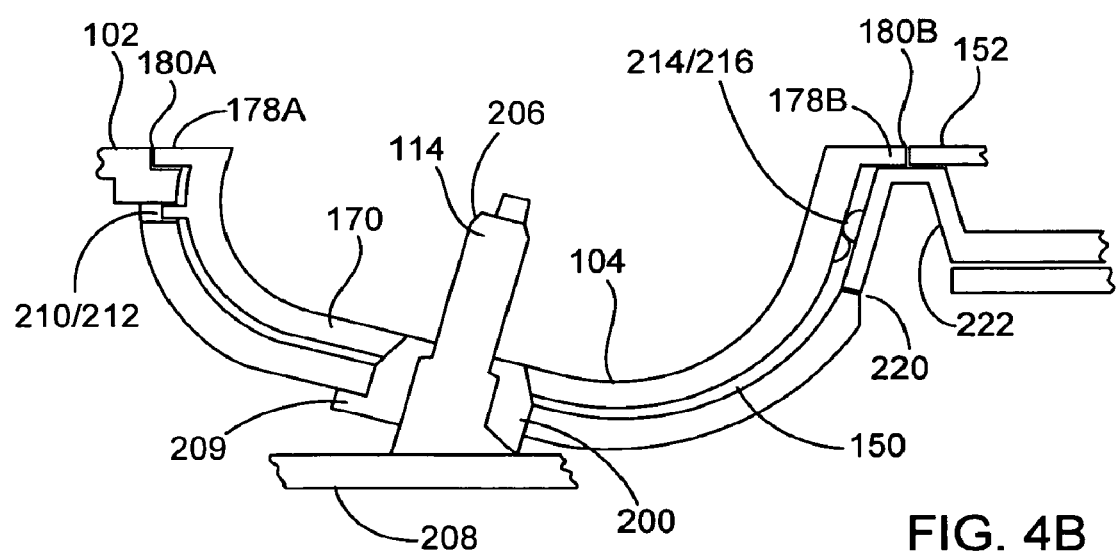

Referring to FIGS. 4A and 4B, one embodiment of the docking system 100 will be described in greater detail. In this embodiment, the insert 104 is configured to rotate into and out of the docking station 102. For example, the insert 104 may be rotated between a released position (FIG. 4A) and a latched position (FIG. 4B). In the released position, the insert 104 may be removed from the docking station 102. In the latched position, the insert 104 is secured to the docking station 102. As mentioned above, during rotation, the insert 104 pivots about an axis created at the interface between the front lip 178A and the front recess 180A. That is, the edge of the lip 178A abuts the edge of the recess 180A thereby forcing the insert 104 to rotate about this point. As the insert 104 is rotated, the basin 170 is inserted into the cavity 150 and the remaining portions of the lip 178 come into contact with the remaining portions of the recess 180 until the back lip 178B and back recess 180B are fully engaged. The back recess 180B serves as an abutment stop to the rotating insert 104. In its final position, the lip 178 and thus the insert 104 is supported by the recessed portion 180 of the docking station 102.

Because the insert 104 is rotated, the hole 118 in the bottom of the basin 170 is made larger than the connector 114 so that there is enough clearance when the insert 104 is rotated into position within the docking station 102. The larger hole 118 provides sufficient space for the hole 118 to rotate around the connector 114, i.e., the connector does not impede the motion of the insert. Unfortunately, however, this leaves unsightly gaps between the edges of the hole 118 and the connector 114 when the insert 104 is finally positioned in the docking station. In order to correct this problem, the connector 114 is configured with a collar or sleeve 200 that has an outer periphery that coincides with the inner periphery of the hole 118. The collar 200 fills any gaps that would normally occur between the edge of the hole 118 and the connector 114 thereby making the docking station 102 more aesthetically pleasing while preventing particle accumulation.

As shown, the collar 200 is positioned at the base of the connector 114 and has a height that keeps it from interfering with the rotating insert 104. The collar 200 is configured to surround the connector 114, and in most cases, the inner periphery of the collar 200 coincides with the outer periphery of the connector 114. The collar 200 may include a chamfer 202 that matingly engages a corresponding chamfer 204 on the edges of the hole 118. The chamfers 202 and 204 help seat the insert 104 properly with respect to the connector 114. The chamfer 204 also provides more clearance between the rotating insert 104 and the connector 114 (without the chamfer 204 the insert 104 may not be able rotate past the connector 114 making removal or insertion more difficult). The connector 114 itself may further include a tapered edge 206 to provide extended clearance between it and the edge of the hole 118 when the insert 104 is rotated into place within the docking station 102.

When assembled, the connector 114 is positioned on a PCB 208, and the collar 200 is placed over the connector 114. Thereafter, the top member 152 is set in place over the connector 114 thereby trapping the collar 200 between the connector 114 and the bottom wall of the cavity 150. The connector 114 and collar 200 are inserted through an opening in the bottom wall of the cavity 150. The outer periphery of the collar generally coincides with the inner periphery of the opening in the bottom wall (e.g., tight fit). In order to keep the collar 200 trapped, the collar 200 may include a lip 209 that protrudes outwardly and that engages the back surface of the bottom wall.

In order to secure the insert 104 in the cavity 150, the docking system 100 also includes a latching/retention mechanism. In one embodiment, the insert 104 includes one or more tabs 210 along the front surface underneath the lip 178A. The tabs 210 are configured to matingly engage corresponding slots 212 located along the front wall of the cavity 150 underneath the recessed portion 180A. The insert 104 also includes a rib 214 that protrudes along and away from the back surface of the insert 104 underneath the lip 178B. The rib 214 is configured to receive a latch 216 located on the back surface of the cavity 150 underneath the recessed portion 180B. When placed in mating engagement, the tabs 210 and latch 216 cause the insert 104 to be secured to the docking station 102. The depth of the tab/slot interface and rib/latch interface is generally placed so that the lip 178 is placed within the recess 180 when the insert 104 is fully inserted in the docking station 102.

As shown, the latch 216 includes a detent 218 that springs above the rib 214 when the insert 104 is rotated into position within the docking station 102. The detent 218 is disposed through an opening 220 in the backside of the cavity 150 and is biased towards the center of the cavity 150 by a spring action. The detent 218 may for example be attached to a flexure 222 that biases the detent 218 to a forward position. When the insert 104 is rotated into the docking station 102, the rib 214 engages the detent 218 of the docking station 102 and forces the detent 218 to a rearward position away from the center of the cavity 150 (via a cam action). When the detent 218 moves past the rib, the detent 218 resumes its forward position thereby trapping the rib 214 underneath the detent 218. In order to remove the insert 104, a user simply pulls up on the insert 104. During the pulling action, the detent 218 slides against the edges of the rib 214.

When a significant pulling force has been provided, the detent 218 moves to the rearward position thereby releasing the rib 214 from the detent 218. Once released, the insert 104 is free to rotate out of the cavity 150 of the docking station 102.

To elaborate, the detent 218 is attached or integrally connected with the flexure 222. The flexure 222 is disposed within the opening 220 in the backside of the cavity 150 and is attached to a structural element 224 of the docking station 102 such as a housing component or a framing component. The flexure 222 is spring biased in a forward position so that the front face 226 of the flexure 222 is positioned through the opening 220 and lies substantially flush with the surface of the back wall of the cavity 150. The detent 218 is located on the front face 226 and protrudes substantially outward from the front face 226. The detent 218 may be rounded to provide a smooth cam action with the bottom of the basin 170 and eventually with the rib 214. The rib 214 may also be rounded for at least the same reasons.

When the insert 104 is rotated into the docking station 102, the outer surface of the basin 170 engages the detent 218 and forces the detent 218 to a rearward position away from the center of the cavity 150 against the spring action of the flexure 222. That is, the flexure 222 bends backwards under the cam force thereby allowing the detent 218 to move out of the cavity 150 and into the interior of the docking station 102. When the rib 214 is positioned underneath the detent 218, the flexure 222 resumes its natural forward position thereby trapping the rib 214 below the detent 218. As a result, the insert 104 is prevented from moving out of the docking station 102 on its own.

In order to remove the insert 104, a user simply pulls up on the insert 104, and when a significant pulling force has been provided, the flexure 222 flexes thereby releasing the rib 214 from the detent 218. Once released, the insert 104 is free to rotate out of the docking station 102. Using this arrangement, the user simply has to overcome the spring bias at the detent/rib interface when rotating the insert 104 in and out of the docking station. When designed appropriately, the insert can be inserted and extracted with simplicity, ease and minimal effort.

It is generally believed that the greater the spring force, the greater the holding force between the insert 104 and the docking station 102. If the force is too great, however, the insert 104 may be difficult to remove. The spring force is therefore designed to provide limited holding power. For example, enough holding power to secure the insert 104 to the docking station 102 while still allowing a user to pull and push the insert 104 into and out of the docking station 102. One advantage of this configuration is that the insert 104 is not locked or snapped in and therefore it may be easily pulled out and pushed into the docking station 102 during the rotating action, i.e., the insert 104 simply rotates in and out.

In one embodiment, the retention mechanism includes a pair of tabs 210 and a pair of corresponding slots 212 at the front interface, and a single rib 214 and a corresponding latch 216 at the back interface. The pair of tab/slot interfaces are typically spatially separated an equal distance from the center of the docking station 102, and the rib/latch interface is typically placed in the center of the docking station 102. As should be appreciated, this triangulation provides three point stability between the insert 104 and the docking station 102.

It should be noted that the rib for interfacing with the detent is not a limitation. Alternatively, the insert may include a recess, slot or void for matingly receiving the detent. In each of these cases, the detent becomes trapped within the space provided by the recess, slot or void via the force of the flexure thereby securing the insert inside the opening. In one implementation, the rib is a bottom wall of a pocket that further includes a top wall and side walls thereby forming a void that extends away from the back surface of the insert. This particular implementation provides greater stability to the rib when long lengths are used as for example when the depth of the basin is small.

Figure 5A:
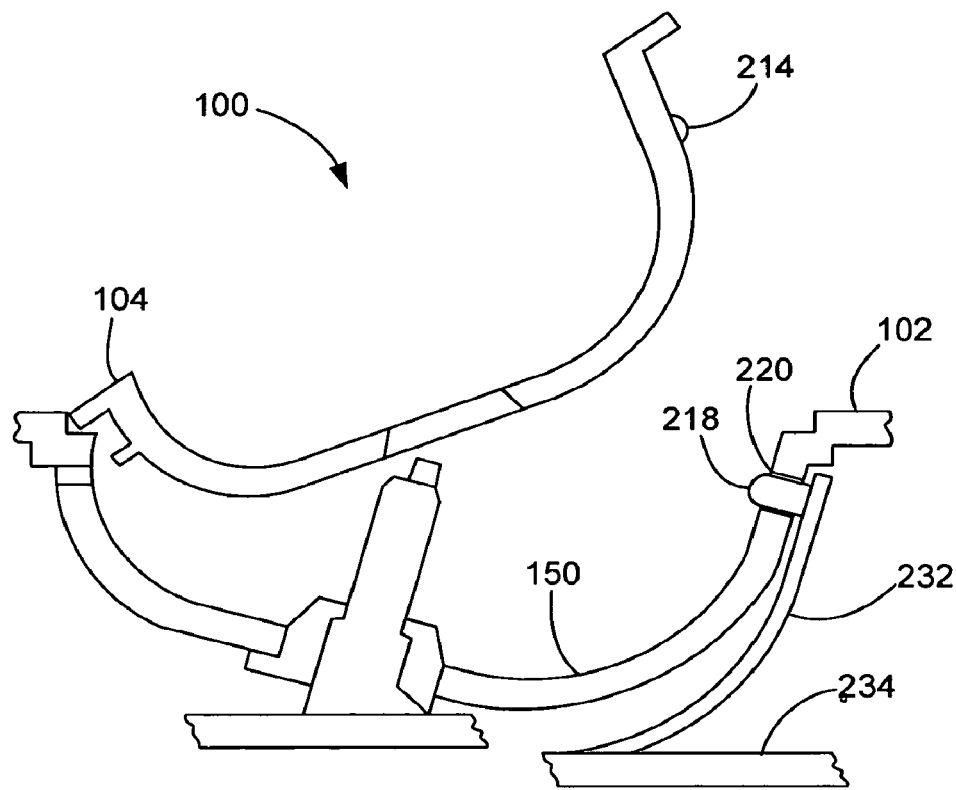
FIGS. 5A and 5B are side elevation views of a docking system, in accordance with one embodiment of the present invention.
Figure 5B:
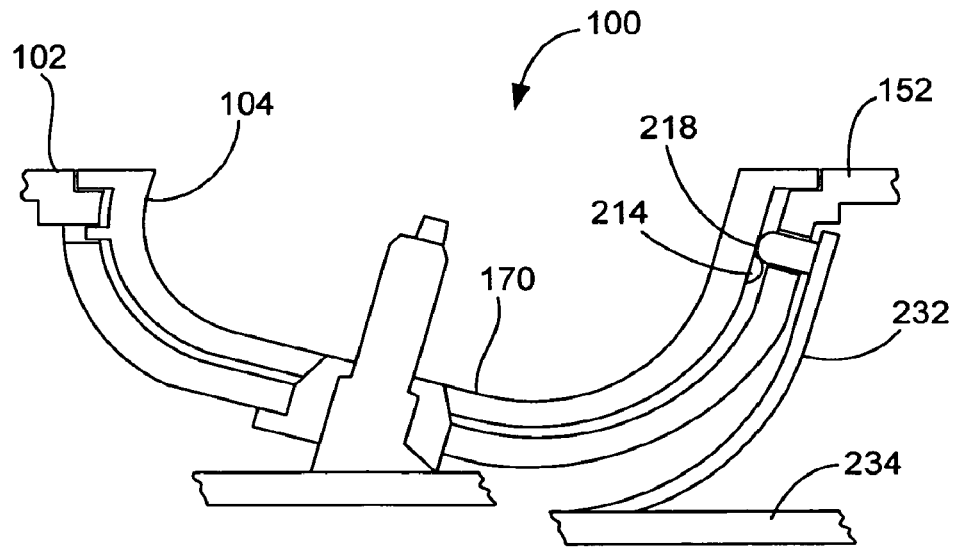

Referring to FIGS. 5A and 5B, another embodiment of the docking system 100 will be described in greater detail. This embodiment is similar to the embodiment shown and described in FIGS. 4A and 4B, however, unlike that embodiment, only the detent 218 is disposed through the opening 220 in the backside of the cavity 150 (not the flexure 222). The opening 220 is sized and dimensioned to only receive the detent 218 therethrough. Furthermore, the detent 218 is integrated with an elongated flexure 232 (or spring arm) that extends along the interior of the back wall of the cavity 150 where it attaches to a structural component 234 such as a housing member or framing member. The structural element 234 may for example be a bottom member of the docking station 102. Similar to the embodiment described in FIG. 4, the flexure 232 is capable of bending so as to allow the detent 218 to move inward and outward through the opening 220 when the insert 104 is rotated in and out of the docking station 102. Alternatively, the flexure 232 may be attached to the top housing 152.

Figure 6:
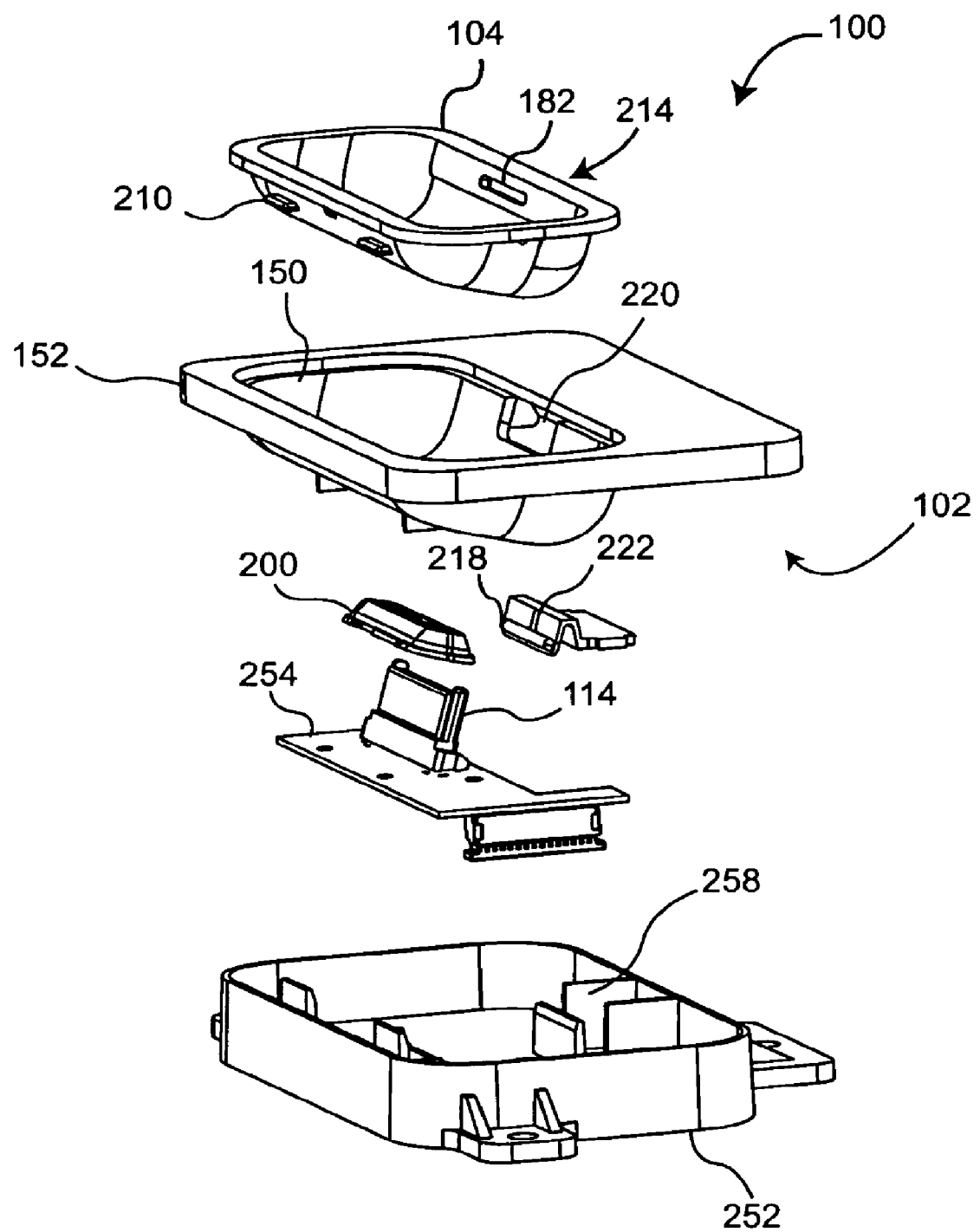
FIG. 6 is a perspective view of a docking system, in accordance with one embodiment of the present invention.

FIG. 6 is an exploded perspective view of a docking system that is capable of being integrated into another device, in accordance with one embodiment of the present invention. The docking system may for example correspond to the docking system described in FIGS. 4A and 4B. As mentioned previously, integrated docking stations are integrated or built into other devices such as personal computers, sound systems, video systems, recording equipment, communication equipment and peripheral devices such as printers, keyboards and the like. In the integrated docking station, the base is typically provided by the housing of the device that it is integrated with, i.e., the docking station utilizes the housing of the device rather than having its own housing.

In this embodiment, the docking station 102 includes a top member 152 and a frame 252. The top member 152 is typically located at an outer surface of the housing of the host device, and the frame 252 is typically located inside the housing of the host device. The top member 152 may be an integral portion of the housing of the host device or it may be a separate component that is positioned within the outer surface of the host device. In either case, the top member forms a portion of the housing of the host device, and is generally a portion of the top surface of the host device. The frame 252 may also be an integral portion of the housing of the host device or it may be a separate component that is seated inside and fixed to the housing of the host device. For example, if not integrally formed therewith, the frame 252 may be attached to the housing of the host device via glues, fasteners, welds, snaps, and/or the like.

The top member 152 is positioned above and attached to the frame 252. The manner in which the top member 152 is attached to the frame 252 may be widely varied. For example, the top member 152 may be attached to the frame 252 (or vice versa) via glues, fasteners, welds, snaps, and/or the like. In one implementation, the top member 152 is attached to the frame 252 via a snapping mechanism. The top member 152 may therefore be attached to the frame 252 via a snap action, i.e., snaps into place. The snapping mechanism typically includes a snap feature 253A on the top member 152 that engages a corresponding snap feature 253B on the frame 252. In some cases, the snap features 253 may also serve as stiffening elements for both the top member 152 and the frame 252.

The frame 252 is configured to support the flexure 222 that is disposed in the opening 220 of the top member 152. By way of example, the flexure 222 may be attached to a support platform 258 of the frame 252. The support platform 258 provides a reference surface for correctly placing the flexure 222 relative to the top member 152. Any suitable attachment technique may be used, including for example, fasteners, glues, welds, snaps and/or the like. The frame 252 is also configured to support a printed circuit board (PCB) 254. The PCB 254 includes the connector 114 and various electronic components for operating the docking system and delivering signals between the docking system and the host device. Any suitable attachment technique may be used, including for example, fasteners, glues, welds, snaps and/or the like.

It should be noted that the embodiment shown in FIG. 6 is not a limitation and that the configuration of the integrated docking system may be widely varied. By way of example, in some cases, a frame may not be used. In cases such as this, the PCB and flexure may be attached to the top member.

Figure 7:
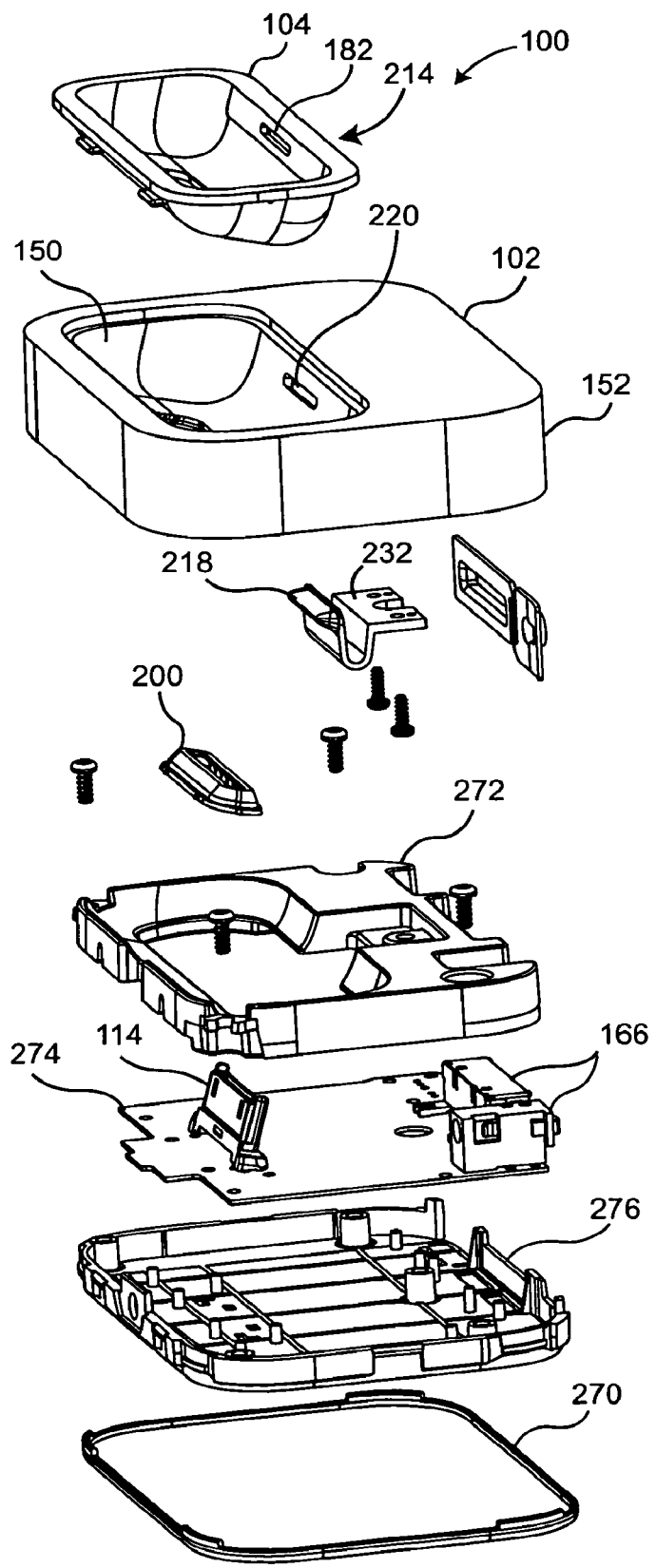
FIG. 7 is a perspective view of a docking system, in accordance with one embodiment of the present invention.

FIG. 7 is an exploded perspective view of a stand alone docking system, in accordance with another embodiment of the present invention. By way of example, the docking system may generally correspond to the docking system described in FIGS. 5A and 5B. The stand alone docking system generally includes a docking station that is separate from the host device. The docking station generally communicates with the host device via wired or wireless connections. For example, the docking station may be connected to the host device via a cable.

In this embodiment, the docking station 102 includes a top member 152 and a bottom member 276 that form the housing of the docking station 102. The top member 152 and bottom member 276 when assembled are configured to enclose internally various electrical and structural components. The top member 152 and bottom member 276 when assembled are also configured to define the shape or form of the docking station 102. The shape may for example be substantially rectangular (as shown) or alternatively the shape may be circular, cubical and the like. By way of example, the top and bottom members 152 and 270 may be attached using any suitable technique including for example screws, bolts, adhesives, welds, latches, snaps, etc. In the illustrated embodiment, the top and bottom members are attached via a snap mechanism so as to preserve the outer surfaces of the docking station. In this embodiment, the sides of the top member are slide over the sides of the bottom member so that the snap features can engage one another.

The docking station also includes various components that are located inside the assembled top and bottom members. The docking station may for example include a steel weight 272 for helping stabilize the docking station, and a printed circuit board (PCB) 274 for supporting the electronic circuitry of the docking station including for example the connector 114 as well as the various jacks and ports 166 of the docking station. The docking station also encloses the flexure 232. Unlike the embodiment shown in FIGS. 5A and 5B, however, the flexure 232 is attached to the top member 152 and positioned so that the detent 218 extends into the cavity 150 of the insert 104. Any suitable attachment technique may be used, including for example, fasteners, glues, welds, snaps and/or the like. In the illustrated embodiment, screws are used. Alternatively, the flexure may be integrally formed with the top member.

It should be noted that the embodiment shown in FIG. 7 is not a limitation and that the configuration of the stand alone docking system may be widely varied. By way of example, in some cases the flexure may be attached directly or indirectly to the bottom member 276 rather than to the top member. In addition, the docking system may include additional components such as rubber foot 270 that is attached to the bottom surface of the bottom member (e.g., via glue).

Figure 8:
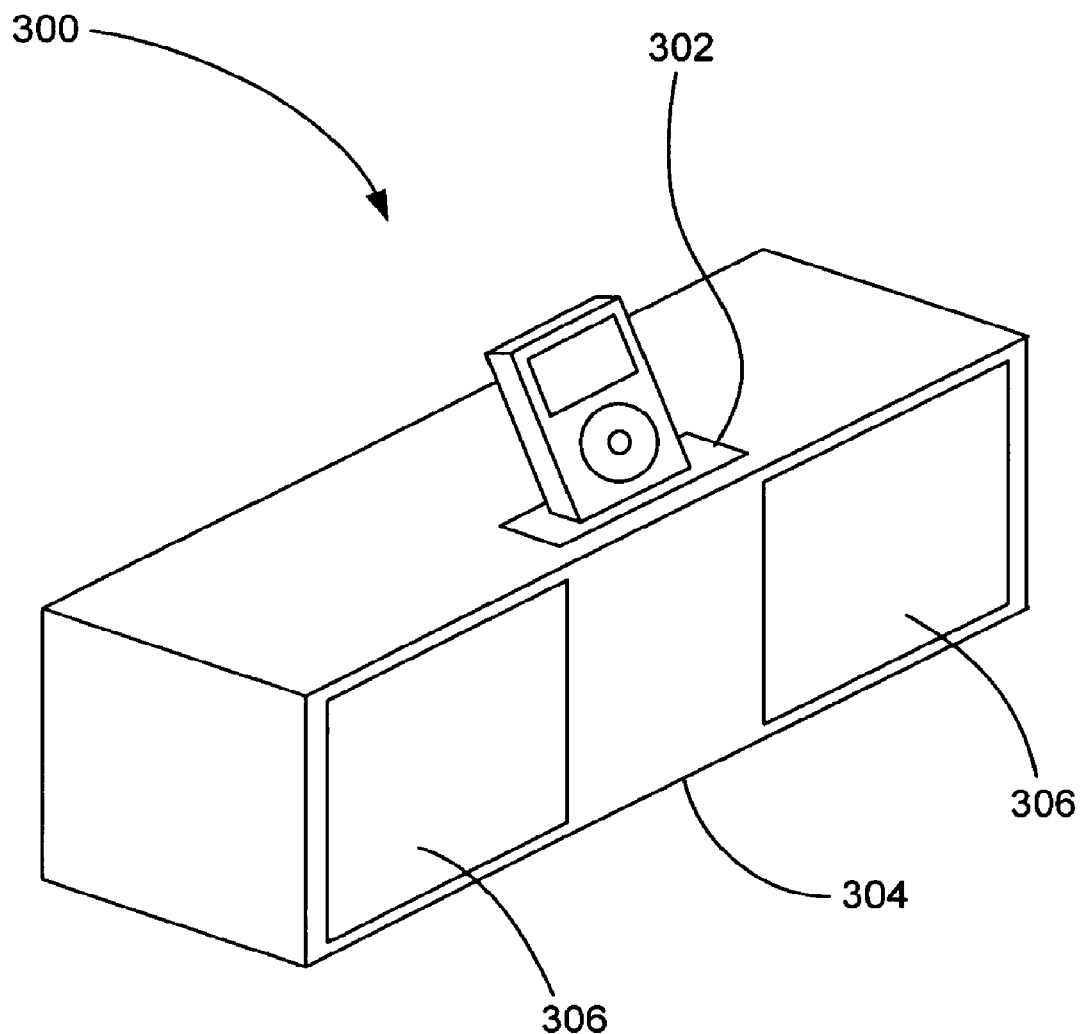
FIG. 8 is a perspective view of a sound system with an integrated docking station, in accordance with one embodiment of the present invention.

FIG. 8 is a perspective view of a sound system 300 with an integrated docking station 302, in accordance with one embodiment of the present invention. The integrated docking station 302 may for example correspond to the one described in FIG. 6. The sound system 300, on the other hand, is a boom box or portable music system that includes a base 304 and a pair of speakers 306. The docking station 302 is integrated within the base 304 and allows various hand held electronic devices especially a music player such as the iPod to communicate with the internal circuitry of the base 304 so that music stored on the music player can be broadcast on the boom box via the speakers 306. The docking station 302 can be placed anywhere on the base 304. In the illustrated embodiment, however, the docking station 302 is placed on the top surface of the base 304.

In each of the various embodiments described above, the components of the docking station may be formed from a variety of materials. By way of example, plastic materials such as polycarbonate (PC), ABS, or PC-ABS may be used for the housing, the insert and the latching mechanism such as the flexure and detent. Alternatively, the flexure may be formed from a metal material such as spring steel.

While this invention has been described in terms of several preferred embodiments, there are alterations, permutations, and equivalents, which fall within the scope of this invention.

It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A docking station for handheld devices with varying shapes and sizes, the docking station comprising:
   a top member with a cavity formed therein, the cavity being configured to rotatably receive a removable insert that accommodates the bottom end of a hand held device with a particular size and shape;
   a connector disposed in the cavity, the connector protruding through a bottom wall of the cavity and having a base; and
   a collar surrounding and positioned at the base of the connector, the collar protruding through the bottom wall of the cavity with the connector;
   wherein the collar includes a chamfer,
   wherein the chamfer of the collar matingly engages a corresponding chamfer on an edge of a hole in the removable insert.

2. The docking station as recited in claim 1, wherein the cavity includes one or more slots on a first side of the cavity, the slots being configured to capture corresponding tabs of the removable insert.

3. The docking station as recited in claim 2, wherein the cavity further includes a latch on a second side of the cavity, the latch being configured to capture a rib of the removable insert, and the first side being opposite the second side.

4. The docking station as recited in claim 2, wherein the one or more slots include a pair of slots on a front side of the cavity, the pair of slots being spaced apart and located on opposite sides of the center of the cavity, and wherein the latch is located on a back side of the cavity proximate the center of the cavity, the pair of slots and latch working together to provide three point stability between the removable insert and the docking station.

5. The docking station as recited in claim 1 wherein the cavity includes an opening and an enclosed region, and wherein the top member includes a recess extending from the opening, the recess being configured to support and position the removable insert relative to the docking station when the removable insert is rotatably received by the cavity, the recess providing a reference point about which the removable insert rotates when being inserted and extracted to and from the docking station.

6. The docking station as recited in claim 1, wherein the docking station is a stand alone unit that operatively couples to an external electronic device through wired or wireless connections.

7. The docking station as recited in claim 1 wherein the docking station is integrated into an electronic device.

8. A docking station for handheld devices with varying shapes and sizes, the docking station comprising:
   a top member with a cavity formed therein, the cavity being configured to rotatably receive a removable insert that accommodates the bottom end of a hand held device with a particular size and shape;
   a connector disposed in the cavity, the connector protruding through a bottom wall of the cavity and having a base; and
   a collar surrounding and positioned at the base of the connector, the collar protruding through the bottom wall of the cavity with the connector;
   wherein the cavity includes one or more slots on a first side of the cavity, the slots being configured to capture corresponding tabs of the removable insert,
   wherein the cavity further includes a latch on a second side of the cavity, the latch being configured to capture a rib of the removable insert, and the first side being opposite the second side,
   wherein the latch includes a detent that springs into engagement with the rib of the removable insert when the removable insert is rotated into position within the docking station, the detent being disposed through an opening in the second side of the cavity, and wherein the detent is attached to a flexure that biases the detent to a forward position in a direction towards the front side.

9. A docking system for a handheld device, the docking system comprising:
   a docking station with a cavity formed therein; and a removable insert having a basin sized to accommodate a particular hand held device, the removable insert being configured to rotate relative to the docking station during insertion and extraction from the docking station, wherein the cavity includes one or more slots on a first side of the cavity, the slots being configured to capture corresponding tabs of the removable insert, wherein the docking station includes a top member in which the cavity is formed, and wherein the removable insert includes a basin for receiving the bottom end of a particular handheld device, the basin being configured to rotate in and out of the cavity during insertion and extraction, wherein the docking station includes a connector located within the cavity, the connector having a base, and the base of the connector being surrounded by a collar, and wherein the basin includes a hole for receiving the connector, an edge of the hole including a chamfer that matingly engages a corresponding chamfer of the collar so as to provide clearance between the basin and the connector when the removable insert is rotated into the docking station, the collar filling the space between the edge of the hole and the outer surface of the connector.

10. The docking system as recited in claim 9, wherein the cavity further includes a latch on a second side of the cavity, the latch being configured to capture a rib of the removable insert, and the first side being opposite the second side.

11. The docking system as recited in claim 9 wherein the removable insert rotates between an initial position, where the removable insert is capable of being inserted or removed from the docking station, and a mounted position, where the removable insert is positioned in the docking station.

12. A docking station, comprising:
a top member with a cavity formed therein, the cavity being configured to rotatably receive a removable insert that accommodates the bottom end of a hand held device with a particular size and shape;
a connector disposed in the cavity, the connector protruding through a bottom wall of the cavity;
a retention mechanism configured to secure the removable insert within the docking station, the retention mechanism including:
one or more slots formed in a front wall of the cavity, the slots being configured to mate with one or more tabs extending from a front wall of the removable insert; and
a collar surrounding and positioned at the base of the connector, the collar protruding through the bottom wall of the cavity with the connector, the collar being configured to produce a snug fit with an opening in the removable insert when the removable insert is positioned within the cavity of the top member, the opening in the removable insert being configured to allow rotation of the removable insert into the cavity without hitting the connector, wherein the collar includes a chamfer,
wherein the chamfer of the collar matingly engages a corresponding chamfer on an edge of a hole in the removable insert.

13. A docking system, comprising:
a docking station including:
a top member;
a cavity formed in the top member and configured to receive a plurality of removable inserts therein, the cavity including an opening and an enclosed region that are sized to accommodate the largest removable insert, the enclosed region having sidewalls and a bottom wall that surround the inserts when they are placed in the cavity;
a recess formed in the top member and surrounding the opening in the cavity;
a connector located within the cavity and protruding through the bottom wall of the cavity; and
a collar surrounding and positioned at the base of the connector, the collar protruding through the bottom wall of the cavity with the connector;
a plurality of removable inserts, each removable insert including:
a basin configured for rotatable insertion into the cavity of the docking station, the basin including an opening and an enclosed region that are sized to accommodate a particular hand held device, the enclosed region having sidewalls and a bottom wall that surround the bottom end of the particular hand held device, the bottom wall including a hole for receiving the connector and collar when the basin is rotated within the cavity of the docking station, the edge of the hole including a chamfer so that the basin clears the connector when the basin is rotated within the cavity of the docking station; and
a lip that surrounds and extends away from the opening in the basin, the lip being configured for placement in the recess in the top member, the recess catching the lip and providing a reference point about which the removable insert is rotated when being inserted and extracted from the cavity of the docking station; and
a retention mechanism configured to secure the removable inserts within the docking station, the retention mechanism including:
one or more slots formed in a front wall of the cavity; and
one or more tabs extending from the front wall of the basin, and being configured to mate with the slots;
wherein the collar includes a chamfer,
wherein the chamfer of the collar matingly engages a corresponding chamfer on an edge of a hole in each of the plurality of removable inserts.

* * * * *